(12) United States Patent
Collier

(10) Patent No.: US 11,823,544 B2
(45) Date of Patent: Nov. 21, 2023

(54) PROXIMITY SAFETY APPARATUS WITH FAST RESPONSE TIME

(71) Applicant: Michael Andrew Collier, Glendale, AZ (US)

(72) Inventor: Michael Andrew Collier, Glendale, AZ (US)

(*) Notice: Subject to any disclaimer, the term of this patent is extended or adjusted under 35 U.S.C. 154(b) by 245 days.

(21) Appl. No.: 17/337,793

(22) Filed: Jun. 3, 2021

(65) Prior Publication Data

US 2021/0358281 A1 Nov. 18, 2021

Related U.S. Application Data

(63) Continuation-in-part of application No. 16/863,916, filed on Apr. 30, 2020, now Pat. No. 11,037,431.

(51) Int. Cl.

| | | |
|---|---|---|
| *G08B 23/00* | (2006.01) | |
| *G08B 15/00* | (2006.01) | |
| *G08B 21/22* | (2006.01) | |
| *F41H 13/00* | (2006.01) | |
| *H04W 4/02* | (2018.01) | |
| *G08B 21/02* | (2006.01) | |

(52) U.S. Cl.
CPC ....... *G08B 15/005* (2013.01); *F41H 13/0018* (2013.01); *G08B 21/0269* (2013.01); *G08B 21/22* (2013.01); *H04W 4/023* (2013.01)

(58) Field of Classification Search
CPC .. G08B 15/005; G08B 21/0269; G08B 21/22; G08B 21/0286; G08B 21/0266; G08B 25/10; G08B 21/02; F41H 13/0018; H04W 4/023; H04W 4/021; H04W 4/029; H04W 4/90

USPC ...................................................... 340/573.4
See application file for complete search history.

(56) References Cited

U.S. PATENT DOCUMENTS

| | | | | |
|---|---|---|---|---|
| 8,866,869 | B2* | 10/2014 | Fennell | G08B 21/0469 |
| | | | | 348/14.02 |
| 10,480,909 | B1* | 11/2019 | Brown | E05B 75/00 |
| 11,062,584 | B1* | 7/2021 | Magaletta | G04G 21/06 |
| 11,507,909 | B2* | 11/2022 | Jones | H04W 72/0453 |
| 2011/0248853 | A1* | 10/2011 | Roper | G08B 21/0288 |
| | | | | 340/573.4 |
| 2020/0410836 | A1* | 12/2020 | Trunzo | G08B 21/0283 |

* cited by examiner

*Primary Examiner* — Tai T Nguyen
(74) *Attorney, Agent, or Firm* — PARSONS & GOLTRY; Robert Parsons; Michael Goltry

(57) ABSTRACT

Safety apparatus including a first monitoring device designed to be locked onto a threatening individual and including GPS apparatus. A second monitoring device designed to be possessed by a threatened victim and including GPS apparatus. A relative motion sensor included in the second monitoring device designed to compare GPS information between the first monitoring device and the second monitoring device and to provide an activating signal when the GPS information indicates closing at a speed greater than the reaction time of the second monitoring device. A rapid response system included in the second monitoring device and connected to receive the activating signal from the relative motion sensor, whereby the rapid response system is activated to send one of a pulse mode and a drive-stun mode to the first monitoring device.

9 Claims, 3 Drawing Sheets

PROXIMITY SAFETY APPARATUS WITH FAST RESPONSE TIME

CROSS-REFERENCE TO RELATED APPLICATIONS

This application is a Continuation-in-Part of U.S. patent application Ser. No. 16/863,916, filed 30 Apr. 2020, issued as U.S. Pat. No. 11,037,431 and claims the benefit thereof.

FIELD OF THE INVENTION

This invention relates to safety apparatus providing a fast response to imminent danger.

BACKGROUND OF THE INVENTION

In many instances courts place restraining orders on individuals who threaten, harass or otherwise are a potential danger to the safety of other individuals or even groups or organizations (e.g. schools, businesses, etc.). However, while restraining orders are intended to stop and theoretically do stop the threatening individual from approaching or entering the area of the threatened individual, there is no guarantee that they will not break the restraining order. When breach of a restraining order occurs, the current recourse is for the threatened individual, business or organization to call law enforcement to confront or detain the threatening individual. Often, the consequences of a breach of a restraining order are undesirable and a call to the police cannot be made or is made untimely. Additionally, restraining orders include a specific distance within which the threatening individual may not approach. Often, nothing can be done to an individual hovering outside this specified distance. The threatened individual, business or organization may not even be aware of this shadowing or that the threatening individual is close, and therefore, cannot take appropriate steps.

While a restraining order is typically to protect a threatened individual, business or organization, it should also protect the threatening individual. There are instances of the threatening individual being confronted by the threatened individual. Currently, if this occurs, the threatening individual is assumed at fault.

There are situations that can or will arise in which the authority notification system will not be sufficient to prevent harm to the threatened individual by the threatening or harassing person being monitored. An example of such a situation is when the threatened individual is walking or riding a bike and the monitored threatening individual is in a motor vehicle (e.g. automobile, motorcycle, truck, etc.). In such an example the distance between the threatened individual and the monitored threatening individual can be covered very rapidly whereby the threatened individual has very little or no warning to defend themselves.

It would be highly advantageous, therefore, to remedy this and other deficiencies inherent in the prior art.

Accordingly, it is an object of the present invention to provide new and improved safety apparatus including fast response time when the standard equipment cannot react fast enough.

It is another object of the present invention to provide new and improved safety apparatus for providing a proximity alert to threatened individuals quickly enough to prevent violence.

SUMMARY OF THE INVENTION

Briefly to achieve the desired objects and advantages of the instant invention, safety apparatus is provided for use in conjunction with court dictated restraining orders. The safety apparatus including a first electronic monitoring device designed to be locked onto a threatening individual, the first electronic monitoring device including GPS apparatus designed to provide GPS information as to the geographic position of the first electronic monitoring device. A second electronic monitoring device designed to be possessed by a threatened victim, the second electronic monitoring device including GPS apparatus designed to provide GPS information as to the geographic position of the second electronic monitoring bracelet. A relative motion sensor included in the second electronic monitoring device designed to compare GPS information between the first electronic monitoring device and the second electronic monitoring device and to provide an activating signal when the GPS information from the first electronic monitoring device indicates closing at a speed greater than the reaction time of the second electronic monitoring device. A rapid response system included in the second electronic monitoring device and connected to receive the activating signal from the relative motion sensor, whereby the rapid response system is activated to send one of a pulse mode and a drive-stun mode to the first electronic monitoring device.

The desired objects and advantages of the instant invention are further achieved in a preferred example of safety apparatus for providing a proximity alert. The safety apparatus including a first electronic monitoring bracelet designed to be locked onto the wrist of a threatening individual, the first electronic monitoring bracelet including GPS apparatus designed to provide GPS information as to the geographic position of the first electronic monitoring bracelet, and a shock unit carried by the first electronic monitoring device, the shock unit including two or more spaced apart electrodes positioned to contact the skin of the threatening individual and functionally equivalent to a taser device. A second electronic monitoring bracelet designed to be worn on the wrist of a threatened individual, the second electronic monitoring bracelet including GPS apparatus designed to provide GPS information as to the geographic position of the second electronic monitoring bracelet. A relative motion sensor included in the second electronic monitoring device designed to compare GPS information between the first electronic monitoring device and the second electronic monitoring device and to provide an activating signal when the GPS information from the first electronic monitoring device indicates closing at a speed greater than the reaction time of the second electronic monitoring device. A rapid response system included in the second electronic monitoring device and connected to receive the activating signal from the relative motion sensor, whereby the rapid response system is activated to send one of a pulse mode and a drive-stun mode to the shock unit of the first electronic monitoring device.

The desired objects and advantages of the instant invention are further achieved in a preferred example of a method of preventing violence when a victim is rapidly approached by a threatening individual, the method including the step of providing safety apparatus including: a first electronic monitoring device locked onto the threatening individual, the first electronic monitoring bracelet including GPS apparatus providing GPS information as to the geographic position of the first electronic monitoring device, and a shock unit carried by the first electronic monitoring device, the shock unit including two or more spaced apart electrodes positioned to contact the skin of the threatening individual and functionally equivalent to a taser device; a second electronic monitoring device possessed by the victim, the second electronic monitoring device including GPS apparatus providing GPS information as to the geographic position of the second electronic monitoring device; a relative motion sensor included in the second electronic monitoring device designed to compare GPS information between the first electronic monitoring device and the second electronic monitoring device and to provide an activating signal when the GPS information from the first electronic monitoring device indicates closing at a speed greater than the reaction time of the second electronic monitoring device; and a rapid response system included in the second electronic monitoring device and connected to receive the activating signal from the relative motion sensor, whereby the rapid response system is activated to send one of a pulse mode and a drive-stun mode to the shock unit of the first electronic monitoring device. The method further includes the steps of sensing GPS information from the first electronic monitoring device indicating closing between the first electronic monitoring device and the second electronic monitoring device at a speed greater than the reaction time of the second electronic monitoring device and sending a signal to the first electronic monitoring device activating the rapid response system to send one of a pulse mode and a drive-stun mode to the shock unit of the first electronic monitoring device.

BRIEF DESCRIPTION OF THE DRAWINGS

Specific objects and advantages of the invention will become readily apparent to those skilled in the art from the following detailed description of a preferred example thereof, taken in conjunction with the drawings in which.

DETAILED DESCRIPTION OF THE DRAWINGS

Figure 1:
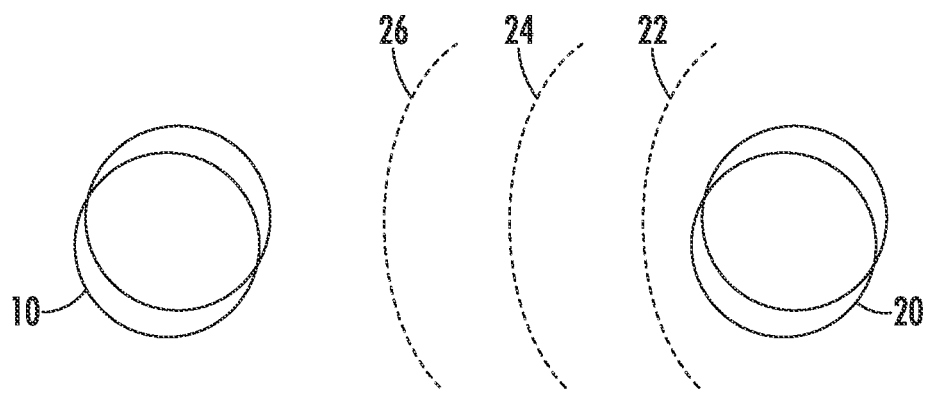
FIG. 1 illustrates a scenario for typical court ordered restraining orders on individuals who threaten, harass or otherwise are a potential danger to the safety of other individuals.

Turning to FIG. 1, an example of a scenario for court ordered restraining orders on individuals who threaten, harass or otherwise are a potential danger to the safety of other individuals, organizations or buildings is illustrated. In this example, an electronic monitoring bracelet 10 is illustrated, to be locked onto a culprit (threatening or harassing person), and a second monitoring device 20, to be possessed by the victim (threatened individuals, organizations or buildings). Bracelet 10 is a device that is secured to the culprit, such as currently used ankle monitors are secured, to prevent removal and if removed without authorization to sound an alarm or give other notice to relevant authorities that bracelet 10 has been removed. It will be understood that second monitoring device 20 need not be secured, and thus can take various different forms as desired, such as a bracelet to be worn by an individual, or other form provided to an organization or building if, for example a business or building has been threatened. In the case of a business or building, second monitoring device 20 is a device to be accepted by security personnel and the like. For purposes of monitoring the culprit's physical position, bracelet 10 includes GPS apparatus. Device 20 also includes GPS apparatus for the purpose of monitoring the culprit's and the victim's relative positions.

A first perimeter 22 is an outer boundary of a violation area defined by a distance from the victim or building. This distance is typically set by court order and is a distance to the victim or building the culprit is not supposed to enter. If the culprit enters perimeter 22 an alarm will be sent to the police designating this infraction, and the police will be directed to immediately go and arrest the culprit for a restraining order violation. The victim will also be given warning that the culprit is in the violation area. A second perimeter 24 is an outer boundary of a warning area defined by a distance from the victim which is greater than the specific distance for the restraining order. The warning area includes the area between second perimeter 24 and first perimeter 22. If the culprit enters second perimeter 24 into the warning area, a warning can be given to the victim that the culprit is nearby. For businesses and building, this will give security a chance to be prepared. If the victim is an individual, the police or other authority can advise a direction to travel to avoid the culprit. Additionally, another warning is sent to the police or other authority. The culprit will then be advised that he is within a warning area and must leave. They can give him advice on a direction to proceed if the victim is an individual and also moving. A third perimeter 26 is an outer boundary of a notification area defined by a distance from the victim which is greater than second perimeter 24. The notification area includes the area between third perimeter 26 and second perimeter 24. If the culprit enters third perimeter 26 into the notification area, notice is given to the culprit that distance to the victim is getting close to the limit set by the restraining order. Direction for increasing the distance can be given at this time, particularly if the victim is an individual who is also on the move. In this manner, chance meeting between the culprit and the victim can be avoided, particularly in cases where the victim is an individual who is moving.

Figure 2:
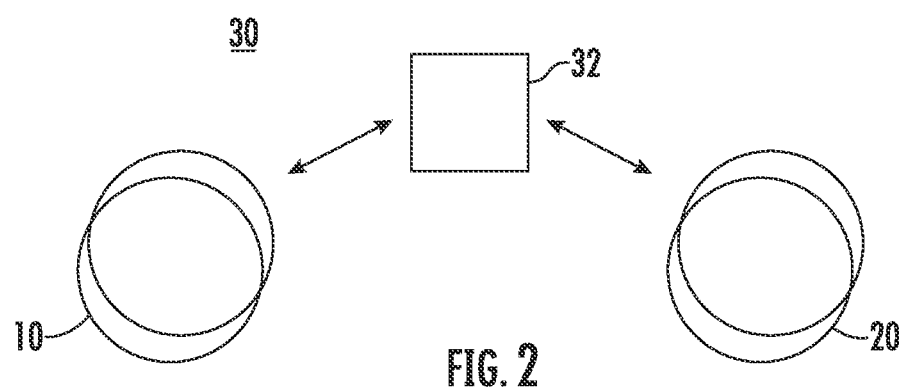
FIG. 2 is a perspective view of a simplified example of safety apparatus for providing a proximity alert to threatened individuals, in accordance with the present invention.

Turning to FIG. 2, a perspective view of a simplified example of safety apparatus, designated 30, for providing a proximity alert to threatened individuals, victims, in accordance with the present invention is illustrated. In this example, first electronic monitoring bracelet 10, to be locked onto the culprit, and second electronic monitoring device 20, to be possessed by the victim, are illustrated. In this example, a remote monitoring station 32 is situated to communicate with both bracelet 10 and device 20, either continuously or within short intervals. Also, in this example both bracelet 10 and device 20 are designed to provide GPS information to monitoring station 32 either continuously or at short intervals. For purposes of this simplified example, monitoring station 32 can be a service set up specifically for the purpose of monitoring individuals or it can simply be a centrally located computer or the like programmed to provide the desired functions.

Through the GPS information, monitoring station 32 continuously knows the physical position of both the culprit and the victim at all times. In a simple example of the operation of safety apparatus 30, if or when the culprit breaches perimeter 26 into the notification area, monitoring station 32 sends a message to the culprit advising him that he must move in a certain direction to get out of the proscribed area. If the culprit moves in conformance with the message, no further communications are necessary. If the culprit continues to move toward the victim and breaches second perimeter 24 into the warning area, monitoring station 32 notifies the police as well as the culprit. Various actions can be taken, but generally they include the police or the monitoring station warning the culprit off. If the culprit continues and breaches third perimeter 26 into the violation area, the police will be advised and will arrest the culprit for violation of the court order. Also, the victim will be notified immediately of the breach and, if an individual, will be advised of a direction to travel to avoid the culprit, or, if the victim is a business or building, security or other designated person will be alerted.

It should be noted that cases in which the victim actually approached the culprit for nefarious purposes have been recorded. Such examples can also be prevented with the present safety apparatus 30. Because both the culprit and the victim are wearing monitoring bracelets, monitoring station 32 can quickly determine the movements of both parties. In the event the victim is moving into or towards the culprit's area, monitoring station 32 can quickly assess the situation and take steps (e.g. reverse the steps described above) to assure the safety of the culprit.

Figure 3:
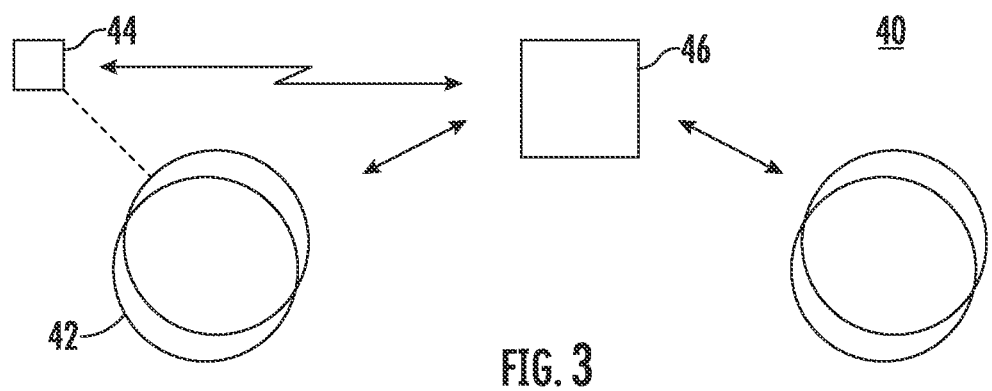
FIG. 3 is a perspective view of another example of safety apparatus including a visual monitor.

It is understood that bracelet 10 is fixed on the culprit's wrist and cannot be easily removed. However, to provide additional assurance that the culprit is being monitored, an embodiment of safety apparatus, designated 40, is illustrated in FIG. 3. In the embodiment of FIG. 3, a bracelet 42 includes a camera 44. Camera 44, either through a transmission from bracelet 42 or an interrogation of bracelet 42 from a monitoring station 46, allows monitoring station 46 to view the culprit's face to ensure that bracelet 42 has not been removed or exchanged with a different person. Monitoring of the culprit's face can be performed, for example, when a perimeter is breached or when any other suspicious actions occur. The monitoring service can request visual identification of the culprit during the warning.

Figure 4:
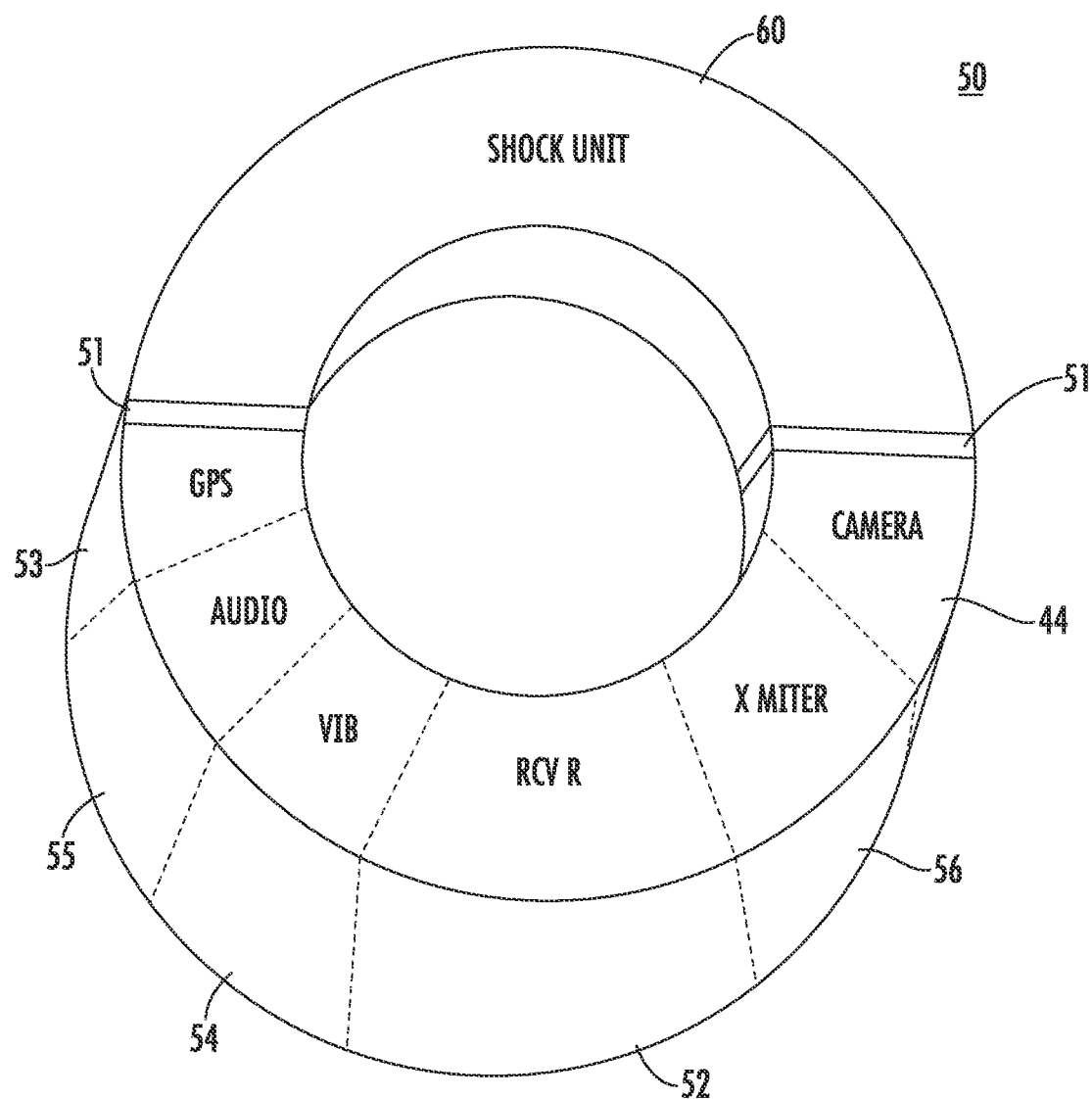
FIG. 4 is another example of safety apparatus for providing a proximity alert to threatened individuals, in accordance with the present invention.

Referring specifically to FIG. 4, a bracelet 50 is illustrated that includes any or all of various electronic components, such as those described in conjunction with bracelets 10 and 42. Bracelet 50 includes hinges/locking mechanism 51 which allow bracelet 50 to be locked around a wrist and removable only with special tools or keys for bracelet 10. Bracelet 50 includes a receiver 52 tuned to receive transmitted signals from a monitoring station, such as 32 or 46. Receiver 52 can be coupled to a notification device, such as a vibrator 54 or an audio signaling device 55. Bracelet 50 includes a GPS device 53 that provides GPS information to monitoring station 32, generally by way of a transmitter 56. Also, transmitter 56 can be included in bracelet 50 to allow the culprit to communicate with monitoring station 32 or 46 or in some instances the police. It will be understood by those of ordinary skill in the art that each or all of the components 52, 54, 55, 56 and camera 44 can be produced in semiconductor chip form (one or more combined in a single chip) and the semiconductor chip or chips can be integrated into a conveniently sized bracelet. A specialized function can be added to help disable a culprit if necessary, specifically for building intrusions. Specifically, a shock unit 60 can be carried by the bracelet 50. Shock unit 60 can be formed in the shape of two or more spaced apart electrodes, designated 62 and 64, that contact the skin of the monitored threatening individual. Shock unit 60 is functionally equivalent to a taser device and can disable the culprit or the arm to which it is attached when activated. Use of shock unit 60 would be warranted in situations wherein the culprit enters a building or accosts a person and threatens violence. In this instance the authorities such as the police can use this feature to disable the culprit until apprehended.

It should also be understood that device 20 or 40, possessed by the victim, can include any or all of the components described in conjunction with bracelet 50 of FIG. 4. Further, either device 20 or 40 can include any or all of the components produced in semiconductor chip form (one or more combined in a single chip) and the semiconductor chip or chips can be integrated into a conveniently sized bracelet or other form as required. For example, the victim's monitoring device 20 or 40 can be included in a wristwatch assembly or the like that can include other uses and that will be unidentifiable as a component of safety apparatus 30 or 40.

There are situations that can or will arise in which the authority notification system described above will not be sufficient to prevent harm to the threatened individuals by the threatening or harassing person being monitored. An example of such a situation is when the threatened individual is walking or riding a bike and the monitored threatening individual is in a motor vehicle (e.g. automobile, motorcycle, truck, etc.). In such an example the distance between the threatened individual and the monitored threatening individual can be covered very rapidly whereby the threatened individual has very little or no warning to defend themselves. For example, and with referring to FIG. 1, the distance between any of perimeters 22, 24, and even 26 and electronic monitoring device 20 could be covered in a speeding vehicle even before any signal from the electronic monitoring device 20 would be realized or noted.

Figure 5:
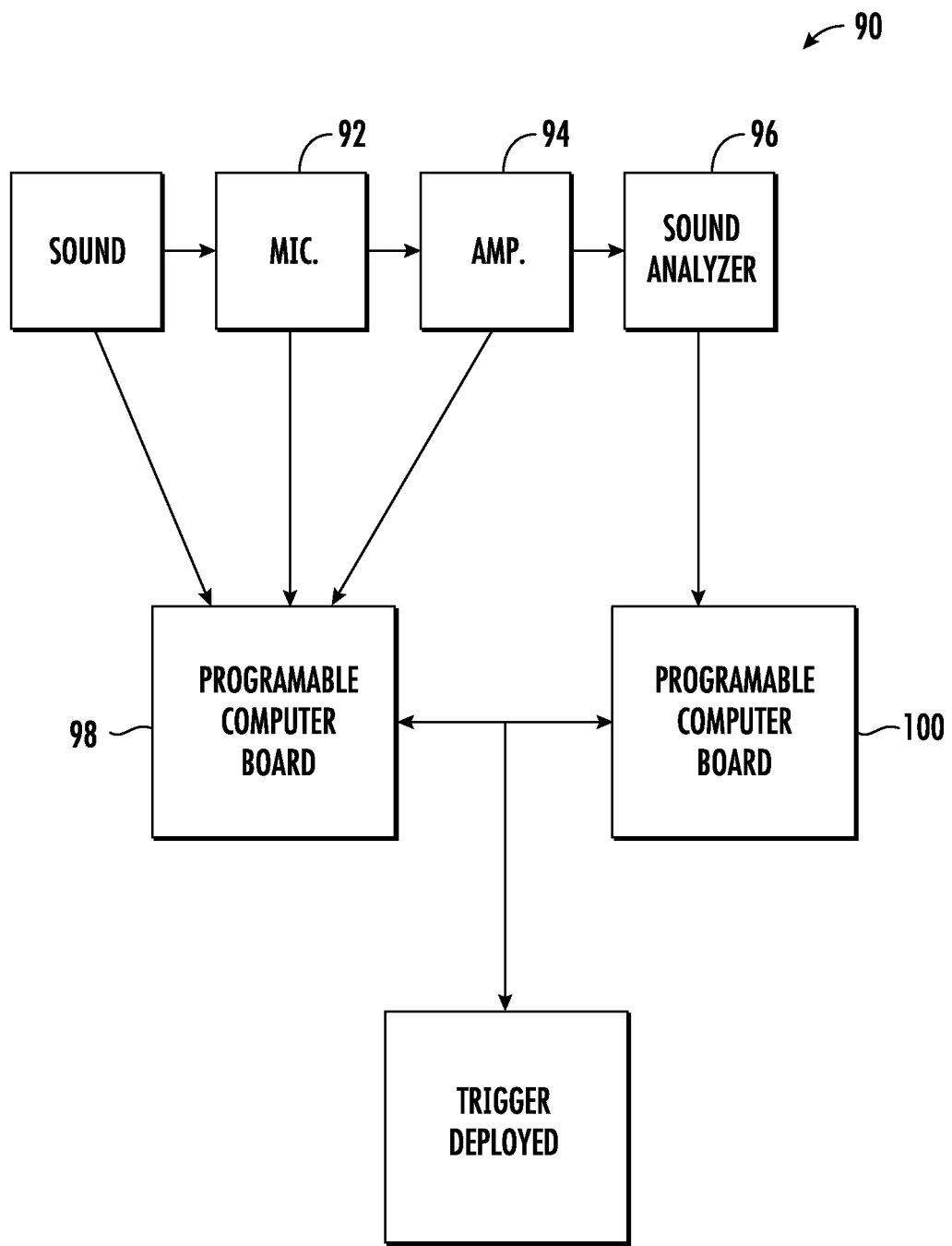
FIG. 5 is an example of a monitoring device carried by a threatened victim and incorporating a rapid response system.

To solve this problem the electronic monitoring device carried by the threatened individual, in the preferred embodiment includes a rapid response system, an example of which is illustrated in FIG. 5. Here it should be understood that the electronic monitoring device carried by the threatened individual could be in the form of a bracelet as illustrated in FIG. 4, a wrist watch (as described above), or a smart phone-like device, designated 70, and illustrated in FIG. 5. It will be understood that any and all such devices are intended to come within the definition of "electronic monitoring device". Using device 70 as an example, included is a receiver 72 tuned to receive transmitted signals from a monitoring station, such as 32 or 46. Receiver 72 can be coupled to a notification device, such as a vibrator 74 or an audio signaling device 75. Device 70 includes a GPS device 73 that provides GPS information to monitoring station 32, generally by way of a transmitter 76. It will be understood by those of ordinary skill in the art that each or all of the components 72, 73, 74, 75, and 76 can be produced in semiconductor chip form (one or more combined in a single chip) and the semiconductor chip or chips can be integrated into a conveniently sized device of the form selected.

Device 70, in this preferred embodiment, also includes a rapid response system 80 and a relative motion sensor 82, which may be a component of rapid response system 80 or a separate component attached to rapid response system 80. Relative motion sensor 82 is designed to sense relative motion between, for example, bracelet 50 and device 70. The sensing can be accomplished, for example, by monitoring GPS device 53 in bracelet 50 directly or through transmissions from transmitter 56. GPS readings are compared and relative motion between the threatened individual and the monitored threatening individual are sensed. In instances where the relative motion is high, especially if perimeter 22 has been breached, rapid response system 80 will be activated.

As an example of the operation of relative motion sensor 82 and rapid response system 80, when relative motion sensor 82 senses the distance between bracelet 10 and bracelet 20 (or device 70) closing at a speed greater than the reaction time of bracelet 20 (or device 70), relative motion sensor 82 will send an activating signal to rapid response system 80. For purposes of this disclosure, the "reaction time" is defined as the time required for bracelet 20 (or device 70) to provide a warning (audio or vibratory) to the threatened individual.

Rapid response system 80 has two modes of operation, in the first pulse mode a pulse is sent to shock unit 60 of bracelet 50, the electrical impulse from shock unit 60 travels to muscles of the monitored threatening individual and causes short or long sustained muscle contractions. The neural signals that control muscles become uncoordinated and muscles contract at random.

The second mode, a drive-stun mode, uses pain to get compliance. The second mode can be activated in either of two ways. A distance activate, when activated at a designated distance bracelet 50 becomes a conducted electrical weapon or an electroshock weapon. In this activation way the two electrodes 62 and 64 of shock unit 60 deliver electric current to disrupt voluntary control of muscles causing "neuromuscular incapacitation". In a second activation way, Rapid Response System 80 will sense a specific sound to which it is specifically designed to react. The specific sound could be, for example, a trigger click and hammer drop, or the sound of a cartridge exploding. Upon sensing the specific sound, rapid response system 80 will activate in a split second to deliver electric current to disrupt voluntary control of muscles which in many instances will cause will cause the shooter to flinch or jerk and miss the target.

An example of sensing structure, designated 90, within rapid response system 80 and designed to sense the specific sound to which it is designed to react is illustrated in FIG. 6. In this specific example. Structure 90 includes a microphone 92 situated to receive sound from an external source. Microphone 92 upon receiving a specific sound sends the sound through an amplifier 94 to a sound analyzer 96. The sensed sound is also sent directly to a programmable computer board 98, since in some instances the sound may not require amplifying and analyzing. Signals/information from sound analyzer 96 are sent to a programmable computer board 100. Both programmable computer boards 98 and 100 are connected to deploy a trigger or activation signal to shock unit 60 of bracelet 10. Programmable computer boards 98 and 100 are designed to deploy a trigger or activation signal within a few microseconds of confirmation that the sound sensed is in fact the specific sound to which it is designed to react.

Thus, the present invention discloses and provides new and improved safety apparatus for providing a proximity alert. The new and improved safety apparatus provides a proximity signal or notification so that individuals being protected can take protective and/or avoidance steps when threatening individuals approach. In situations where the safety apparatus cannot respond quickly enough to prevent violence a rapid response system automatically stops the threatening individual from harming the threatened individual.

Various changes and modifications to the examples herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Safety apparatus for use in conjunction with court dictated restraining orders, the safety apparatus comprising:
   a first electronic monitoring device designed to be locked onto a threatening individual, the first electronic monitoring device including GPS apparatus designed to provide GPS information as to a geographic position of the first electronic monitoring device;
   a second electronic monitoring device designed to be possessed by a threatened victim, the second electronic monitoring device including GPS apparatus designed to provide GPS information as to the geographic position of the second electronic monitoring device;
   a relative motion sensor included in the second electronic monitoring device designed to compare GPS information between the first electronic monitoring device and the second electronic monitoring device and to provide an activating signal when the GPS information from the first electronic monitoring device indicates closing at a speed greater than a reaction time of the second electronic monitoring device; and
   a rapid response system included in the second electronic monitoring device and connected to receive the activating signal from the relative motion sensor, whereby the rapid response system is activated to send one of a pulse mode and a drive-stun mode to the first electronic monitoring device; and
   a remote monitoring station situated to communicate with both the first electronic monitoring device and the second electronic monitoring device.

2. The safety apparatus as claimed in claim 1 further including a shock unit carried by the first electronic monitoring device.

3. The safety apparatus as claimed in claim 2 wherein the shock unit includes two or more spaced apart electrodes positioned to contact skin of the threatening individual.

4. The safety apparatus as claimed in claim 3 wherein the shock unit including two or more spaced apart electrodes is functionally equivalent to a taser device.

5. The safety apparatus as claimed in claim 2 wherein the rapid response system is designed to sense a specific sound to which it is specifically designed to react and upon sensing the specific sound the rapid response system activates in the drive-stun mode to deliver electric current to the shock unit carried by the first electronic monitoring device and disrupt voluntary control of muscles of the threatening individual.

6. Safety apparatus for providing proximity alerts, the safety apparatus comprising:
   a first electronic monitoring device designed to be locked onto a wrist of a threatening individual, the first electronic monitoring device including GPS apparatus designed to provide GPS information as to a geographic position of the first electronic monitoring device, and a shock unit carried by the first electronic monitoring device, the shock unit including two or more spaced apart electrodes positioned to contact skin of the threatening individual and functionally equivalent to a taser device;
   a second electronic monitoring device designed to be worn on a wrist of a threatened individual, the second electronic monitoring device including GPS apparatus designed to provide GPS information as to a geographic position of the second electronic monitoring device;
   a relative motion sensor included in the second electronic monitoring device designed to compare GPS information between the first electronic monitoring device and the second electronic monitoring device and to provide an activating signal when the GPS information from the first electronic monitoring device indicates closing at a speed greater than a reaction time of the second electronic monitoring device;

a rapid response system included in the second electronic monitoring device and connected to receive the activating signal from the relative motion sensor, whereby the rapid response system is activated to send one of a pulse mode and a drive-stun mode to the shock unit of the first electronic monitoring device; and a remote monitoring station situated to communicate with both the first electronic monitoring device and the second electronic monitoring device.

7. The safety apparatus as claimed in claim 6 wherein the rapid response system is designed to sense a specific sound to which it is specifically designed to react and upon sensing the specific sound the rapid response system activates in the drive-stun mode to deliver electric current to the shock unit carried by the first electronic monitoring device and disrupt voluntary control of muscles of the threatening individual.

8. A method of preventing violence when a victim is rapidly approached by a threatening individual, the method including steps of:

providing safety apparatus including:
a first electronic monitoring device locked onto the threatening individual, the first electronic monitoring device including GPS apparatus providing GPS information as to a geographic position of the first electronic monitoring device, and a shock unit carried by the first electronic monitoring device, the shock unit including two or more spaced apart electrodes positioned to contact skin of the threatening individual and functionally equivalent to a taser device;

a second electronic monitoring device possessed by the victim, the second electronic monitoring device including GPS apparatus providing GPS information as to a geographic position of the second electronic monitoring device;

a relative motion sensor included in the second electronic monitoring device designed to compare GPS information between the first electronic monitoring device and the second electronic monitoring device and to provide an activating signal when the GPS information from the first electronic monitoring device indicates closing at a speed greater than a reaction time of the second electronic monitoring device; and a rapid response system included in the second electronic monitoring device and connected to receive the activating signal from the relative motion sensor, whereby the rapid response system is activated to send one of a pulse mode and a drive-stun mode to the shock unit of the first electronic monitoring device;

sensing GPS information from the first electronic monitoring device indicating closing between the first electronic monitoring device and the second electronic monitoring device at a speed greater than the reaction time of the second electronic monitoring device; and sending a signal to the first electronic monitoring device activating the rapid response system to send one of a pulse mode and a drive-stun mode to the shock unit of the first electronic monitoring device.

9. The method as claimed in claim 8 further including a step of the rapid response system sensing a specific sound to which it is specifically designed to react and upon sensing the specific sound the rapid response system activates in the drive-stun mode to deliver electric current to the shock unit carried by the first electronic monitoring device and disrupt voluntary control of muscles of the threatening individual.

* * * * *